(12) United States Patent
Lasagni

(10) Patent No.: US 7,741,817 B2
(45) Date of Patent: Jun. 22, 2010

(54) CIRCUIT FOR THE GENERATION OF TWO SYMMETRICAL BUSES OF TENSION WITH RESPECT TO THE NEGATIVE OF THE FEEDING TENSION

(75) Inventor: Cesare Lasagni, Reggio Emilia (IT)

(73) Assignee: Meta Systems S.p.A., Reggio Emilia (IT)

( * ) Notice: Subject to any disclaimer, the term of this patent is extended or adjusted under 35 U.S.C. 154(b) by 299 days.

(21) Appl. No.: 11/887,425

(22) PCT Filed: Apr. 7, 2006

(86) PCT No.: PCT/IB2006/000803

§ 371 (c)(1),
(2), (4) Date: Sep. 28, 2007

(87) PCT Pub. No.: WO2006/106417

PCT Pub. Date: Oct. 12, 2006

(65) Prior Publication Data

US 2009/0251124 A1      Oct. 8, 2009

(30) Foreign Application Priority Data

Apr. 8, 2005    (IT)    .................. MO2005A0081

(51) Int. Cl.
*G05F 1/10* (2006.01)
(52) U.S. Cl. .................................. 323/222
(58) Field of Classification Search .............. 323/222, 323/224, 225, 268, 271; 363/59, 60
See application file for complete search history.

(56) References Cited

U.S. PATENT DOCUMENTS

| 5,306,954 | A | * | 4/1994 | Chan et al. | ................... 307/110 |
| 5,793,190 | A | * | 8/1998 | Sahlstrom et al. | ............ 323/222 |
| 6,008,630 | A | * | 12/1999 | Prasad | ......................... 323/222 |
| 7,049,793 | B2 | * | 5/2006 | Itoh et al. | .................... 323/222 |
| 7,116,084 | B2 | * | 10/2006 | Braun et al. | ................. 323/222 |

FOREIGN PATENT DOCUMENTS

| EP | 0438323 | * | 7/1991 |
| JP | 03045160 | * | 2/1991 |

OTHER PUBLICATIONS

International Search Report of PCT/IB2006/000803 Mar. 8, 2006.*

* cited by examiner

*Primary Examiner*—Matthew V Nguyen
(74) *Attorney, Agent, or Firm*—Dykema Gossett PLLC

(57) ABSTRACT

Circuit for the generation of two symmetrical buses of tension with respect to the negative of the feeding tension, comprising supply means able to supply a power step-up circuit comprising an inductor, a switch, a diode and a condenser, an LC filter being arranged in cascade to said power step-up circuit, a pair of switches with relevant re-circulation diodes being connected in cascade to said LC filter, whose peculiar aspect is that said supply means comprise a single supply source, and a circuit branch consisting of a condenser and a diode connected in series the one to the other and in parallel to said switch and said condenser of said power step-up circuit, a further inductor with diode in series being connected between the anode end of said circuit branch diode and a condenser connected symmetrically with respect to the condenser of said power step-up circuit.

12 Claims, 2 Drawing Sheets

CIRCUIT FOR THE GENERATION OF TWO SYMMETRICAL BUSES OF TENSION WITH RESPECT TO THE NEGATIVE OF THE FEEDING TENSION

TECHNICAL FIELD

The present invention refers to a circuit for the generation of two symmetrical buses of tension with respect to the negative of the feeding tension.

BACKGROUND ART

More specifically the invention refers to a circuit able to realise two power buses symmetric with respect to the power voltage negative, without the need for a central socket in the power supply itself and without the need for feedback on the negative bus.

As is known, in the case of electronic circuits, it is often necessary to reconstruct an alternate voltage starting with a direct one.

The direct voltage at input has to be transformed into two direct voltages symmetric with respect to the central point that joins the positive of one voltage to the negative of the other. This occurs, for instance, in half-bridge inverters that realise the two positive and negative half waves, taking the respective direct voltages at the ends of two buses, symmetric with respect to the central zero and connected to the above-described polarities.

The two buses normally have a higher power voltage than the available source and a power step-up circuit is therefore required which, starting with the lower voltage, is able to generate the two high bus voltages symmetrically with respect to the central zero.

Considering that at output, power draw occurs at the same time as the half wave involved, each of the two buses must be able to provide this power in a fully independent way from the other bus, otherwise there would be a strong rise in the power voltage of one when power is drawn from the other and vice versa.

A typical circuit diagram showing an inverter circuit able to reconstruct the alternate mains voltage starting from the direct voltage at input is shown in FIG. 1.

As can be seen from this figure, the direct power source practically consists of two distinct sources $V_A$ and $V_B$ connected in series with central zero so the circuit itself can be easily doubled into two single circuits, one for the negative voltage and the other for the positive voltage.

The two circuits are completely symmetrical with each other.

The drawback of this solution however is that the overall voltage which has to be used is double with respect to that necessary in absolute value, apart from its non-optimal use.

In fact, alternate use is normally made of half at a time of the power actually available at the positive and negative output half wave respectively.

The circuit in FIG. 1 comprises a step-up circuit made up of an inductor 3, a switch 6 and a diode 7, as well as a condenser 10, designed to stabilise the voltage of the positive bus $V_1$.

The inductor 3 and the diode 7 are arranged in series respectively, while the switch 6 is in parallel to the condenser 10 and supply source $V_A$.

A similar step-up circuit is provided for the second supply source $V_B$ and comprises in this case an inductor 4, a switch 5, a diode 8 and a condenser 9, corresponding respectively to inductor 3, switch 6, diode 7 and condenser 10 of the step-up circuit described above.

The output voltage of the circuit is drawn at the ends of a condenser 16 which is connected at a central node between the condensers 9 and 10.

The step-up circuits described above therefore make it possible to raise the voltage $V_A$ to the voltage of the positive bus $V_1$ and the voltage $V_B$ to the voltage of the negative bus $V_2$.

The two voltages thus obtained are used by two further switches 11 and 12 which, suitably operated at high frequency (normally above the hearing interval) and with the aid of the re-circulation diodes 13 and 14, connected in parallel respectively to the switches 11 and 12, reconstruct the low-frequency sinusoid (typically 50 or 60 Hz).

An LC filter consists of previously described condenser 16 and an inductor arranged in series to this and this filter eliminates the residual high-frequency component from the output voltage $V_{OUT}$.

In this configuration, the voltage available at the ends of the condensers 10 and 9 depends on the relation between the "on" and "off" time of the respective switches 6 and 5, as well as obviously on the load applied to their ends.

Considering that, as was said before, the absorption from the two buses alternates following the wave shape of the alternate voltage $V_{OUT}$ obtained by them, the control of the two switches 5 and 6 must be independent and each tied to the value of the corresponding bus voltage.

A further drawback of the circuit of FIG. 1 is the fact of having to pilot the two switches 5 and 6 which are at opposite polarities with respect to the central zero, normally used as negative by the control logic. In fact, while it is relatively easy to pilot the switch 6 which is at positive voltage with respect to the zero and therefore "at the same side" of the control logic, piloting the switch 5 which is at negative voltage with respect to the control logic is a little more complicated.

The circuit of FIG. 1 is simply an example of many circuit solutions of known type, all of which have in common a double direct supply source, connected in series the one to the other, together with relevant electronic circuitry, used to make two high-voltage buses, these too connected in series the one to the other.

DISCLOSURE OF THE INVENTION

The main aim of the present invention is to make a circuit for the generation of two symmetrical buses of tension with respect to the negative of the feeding tension, which permits having just one supply voltage without the need for a central socket in the supply itself and without the need for feedback on the negative bus.

As part of this aim, a purpose of the present invention is to provide a circuit for the generation of two symmetrical buses of tension with respect to the negative of the feeding tension, in which the two obtained bus voltages are always perfectly the same, the one being symmetric with respect to the supply negative of the other.

Another purpose of the present invention is to provide a circuit for the generation of two symmetrical buses of tension with respect to the negative of the feeding tension, which permits accepting indifferently at input a direct battery voltage or an alternate mains voltage, realising on the latter also the power factor correction function.

A further purpose of the present invention is to provide a circuit for the generation of two symmetrical buses of tension with respect to the negative of the feeding tension which features a simpler circuit compared to circuits of known type.

Not the last purpose of the present invention is to provide a circuit for the generation of two symmetrical buses of tension with respect to the negative of the feeding tension, which is highly reliable, relatively easy to make and at competitive costs.

This aim, as well as these and other purposes better explained below, are achieved by a circuit for the generation of two symmetrical buses of tension with respect to the negative of the feeding tension, comprising supply means able to supply a power step-up circuit comprising an inductor, a switch, a diode and a condenser, an LC filter being arranged in cascade to said power step-up circuit, a pair of switches with relevant re-circulation diodes being connected in cascade to said LC filter, characterized in that said supply means comprise a single supply source, and a circuit branch consisting of a condenser and a diode connected in series the one to the other and in parallel to said switch and said condenser of said power step-up circuit, a further inductor with diode in series being connected between the anode end of said circuit branch diode and a condenser connected symmetrically with respect to the condenser of said power step-up circuit.

BRIEF DESCRIPTION OF THE DRAWINGS

Further characteristics and advantages of the present invention will appear even more evident from the description of some preferred, but not exclusive, embodiments of the circuit according to the invention, illustrated by way of non limiting example in the accompanying drawings, wherein.

WAYS OF CARRYING OUT THE INVENTION

With reference to the aforementioned figures, and especially with reference to FIGS. 2 and 3 in which, to reference numbers identical to those used in previously described FIG. 1 identical elements correspond, the circuit according to the present invention is as follows.

Figure 1:
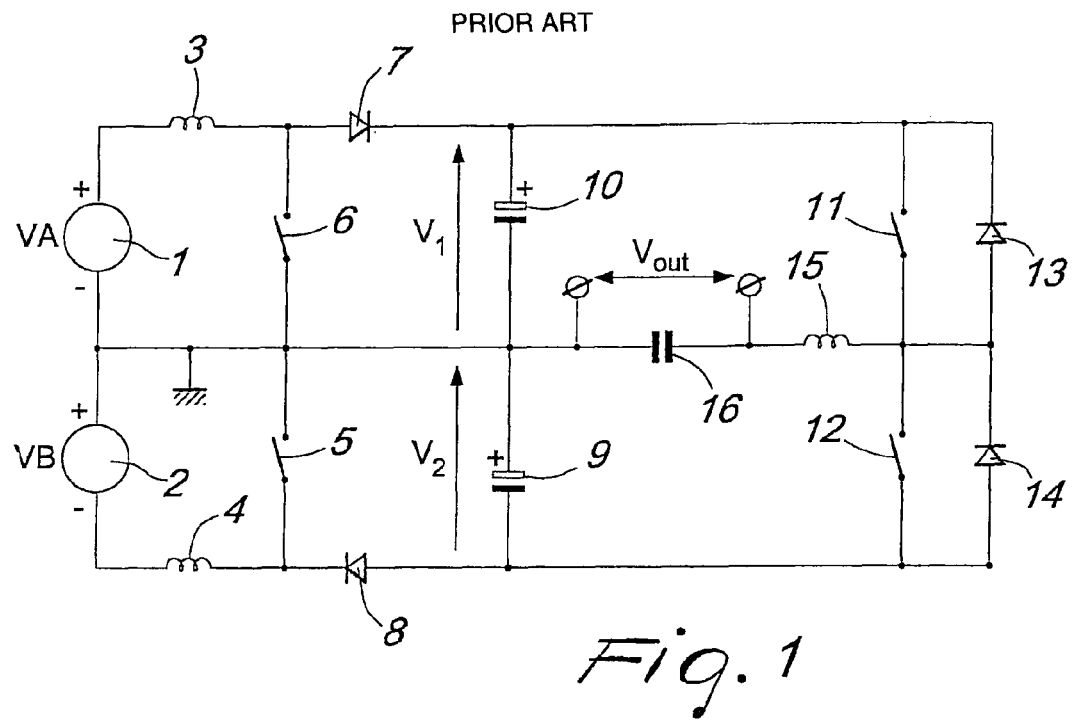
FIG. 1 shows a circuit diagram of an embodied circuit of two symmetric voltage buses, of the known type.

The circuit, generally designated by reference numeral 100, comprises a single supply source $V_A$ (which as will be seen can be both alternate and direct), a relevant step-up circuit, consisting of an inductor 3, a switch 6, a diode 7 and a condenser 10, similarly to the step-up circuit shown in FIG. 1 for the supply source $V_A$.

The remaining part of the circuit, meaning the second condenser 9, arranged symmetrically with respect to the condenser 10, the LC filter consisting of the condenser 16 and the inductor 15, the switches 11 and 12 with the relevant diodes in parallel 13 and 14, is the same as shown in FIG. 1.

The peculiar aspect of the invention is that it features a condenser 18 and a diode 17 arranged together in series and connected in parallel to the switch 6 and to the condenser 10. The anode end of the diode 17 is connected, by placing in between an inductor 19, to the cathode end of the diode 8.

In effect, the additional components described above, meaning the diode 17, the condenser 18, the inductor 19, permit, together with the diode 8 and the condenser 9, already fitted in the circuit of FIG. 1, obtaining the voltage bus $V_2$ needed for the output voltage negative.

The circuit operates as follows.

When the switch 6 closes, the inductor 3 is crossed by a current $I_3$ and stores energy which, released on the opening of the switch 6, charges the condensers 18 and 10.

When the switch 6 closes again, besides the previous signal, we have the reversal of the polarity at the ends of the condenser 18 which however, due to the presence of diode 17 cannot discharge through the switch 6 and therefore recalls current through the inductor 19, used to limit the peaks involved.

The condenser 9 is, therefore, forced to charge at a voltage exactly the same as that of the condenser 18 in turn the same and contrary to that of the condenser 10.

The two desired high-voltage buses are thus obtained, starting with just one, direct, supply voltage $V_A$, and exploiting just one switch 6.

The control, with feedback on the positive bus only, is able to also perfectly control the negative bus because the negative voltage $V_2$, by suitably sizing the condenser 19, will faithfully mirror the voltage at the ends of the condenser itself.

The voltage at the ends of the condenser 18 is only the same, except for the negligible drop on the diode 7, as the positive voltage of bus $V_1$.

Consequently, in the end we have a voltage $V_2$ the same as $V_1$ despite only having control in feedback on $V_1$.

The above described circuit first of all permits a more simplified circuit which calls for fewer costly and cumbersome power components. More specifically, the presence is eliminated of a switch, meaning the switch 5 shown in FIG. 1.

Furthermore, the possibility exists of having a single direct supply source $V_A$, instead of two in series with a central socket, as shown in FIG. 1.

Figure 2:
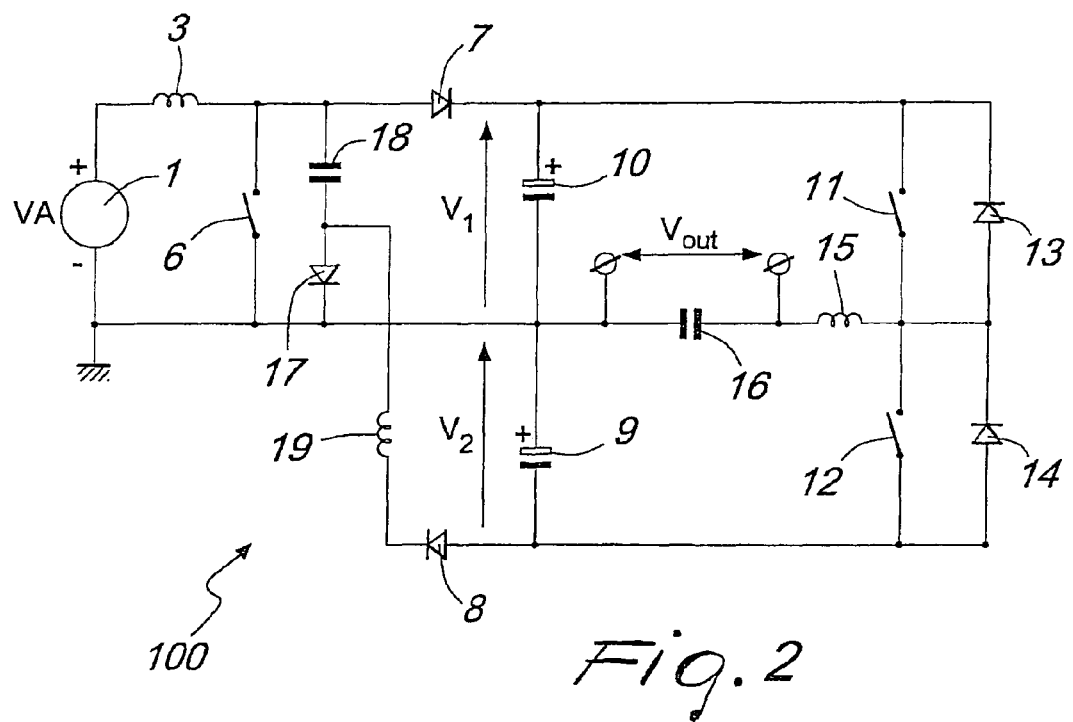
FIG. 2 shows a circuit according to the present invention.

Furthermore still, the solution of FIG. 2 permits absorbing constantly from the sole direct supply source. In the circuit of FIG. 1, on the other hand, the absorption was alternate from one of the two supplies connected in series, simultaneously with the output signal involved.

Figure 3:
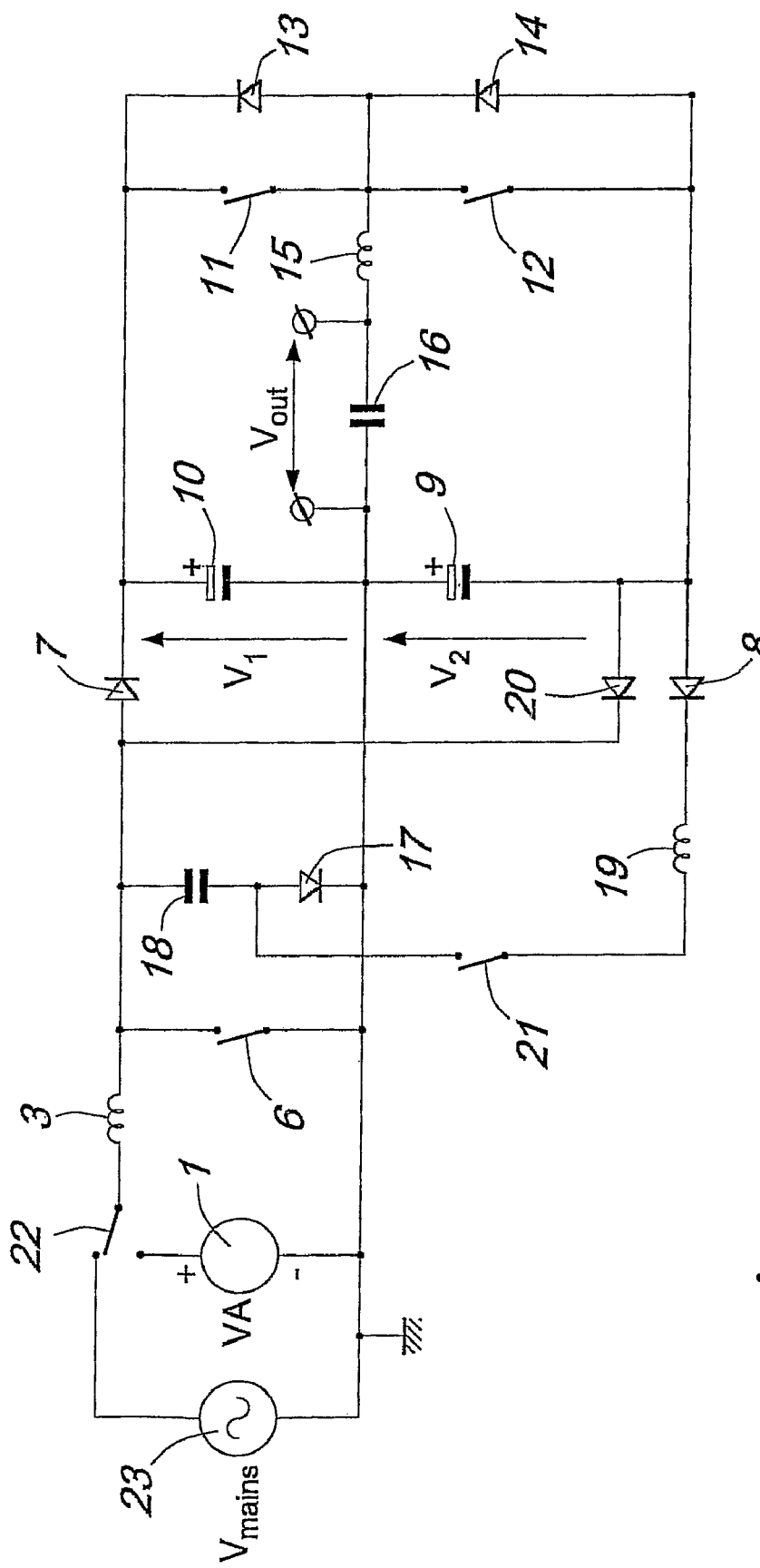
FIG. 3 shows a possible use of the circuit according to the present invention.

FIG. 3 shows an example of application to an on-line UPS unit with direct neutral and dual conversion.

The circuit of FIG. 2 is used in the circuit of FIG. 3, with the addition of a switch 21 connected in series to the diode 8 and to the inductor 19, and with the addition of a diode 20 connected between the anode of the condenser 7 and an end of the condenser 9.

Furthermore, a switch 22 is fitted to connect or disconnect the alternate mains supply 23 from the circuit.

In point of fact, the switch 21 disconnects the part of the circuit that would interfere with the power factor correction circuit, while the addition of the diode 20 is necessary for its correct operation, to make an input stage that accepts indifferently the direct voltage of battery $V_A$ with the switch 22 closed on it and the switch 21 closed, or the alternate voltage of mains supply 23 with the switch 22 closed on it and the switch 21 open. FIG. 3 shows this second circuit configuration in which the circuit according to the invention is supplied by the alternate mains supply 23.

In practice, it has been found that the circuit according to the invention fully achieves the preset aim and purposes, making it possible to provide two symmetric high-voltage buses generated by a single power source (direct or alternate) without central priority.

The circuit thus conceived is susceptible of numerous modifications and variations, all of which falling within the scope of the inventive concept; furthermore all the details can be replaced with other elements that are technically equivalent.

The invention claimed is:

1. A circuit for the generation of two symmetrical buses of tension with respect to the negative of the feeding tension, comprising supply means able to supply a power step-up circuit comprising an inductor, a switch, a diode and a condenser, an LC filter being arranged in cascade to said power step-up circuit, a pair of switches with relevant re-circulation diodes being connected in cascade to said LC filter, wherein said supply means comprise a single supply source, and a circuit branch consisting of a condenser and a diode connected in series the one to the other and in parallel to said switch and said condenser of said power step-up circuit, a further inductor with diode in series being connected between the anode end of said circuit branch diode and a condenser connected symmetrically with respect to the condenser of said power step-up circuit.

2. The circuit according to claim 1, wherein at the ends of said condenser of said power step-up circuit a positive power voltage is generated while at the ends of said condenser symmetric with respect to said step-up circuit condenser a negative power voltage is generated.

3. The circuit according to claim 2, wherein the output voltage of said circuit is drawn at the ends of the condenser of said LC filter.

4. The circuit according to claim 3, wherein said positive power voltage is that used for the positive half wave of said output voltage and said negative rower voltage is that used for the negative half wave of said output voltage.

5. The circuit according to claim 1, wherein said single supply source is a direct supply source.

6. The Circuit according to claim 1, wherein said power step-up means comprise a single power step-up circuit.

7. UPS comprising a circuit according to claim 1.
8. UPS comprising a circuit according to claim 2.
9. UPS comprising a circuit according to claim 3.
10. UPS comprising a circuit according to claim 4.
11. UPS comprising a circuit according to claim 5.
12. UPS comprising a circuit according to claim 6.

\* \* \* \* \*